(12) United States Patent
Kobayashi et al.

(10) Patent No.: US 12,112,749 B2
(45) Date of Patent: Oct. 8, 2024

(54) COMMAND ANALYSIS DEVICE, COMMAND ANALYSIS METHOD, AND PROGRAM

(71) Applicant: NIPPON TELEGRAPH AND TELEPHONE CORPORATION, Tokyo (JP)

(72) Inventors: Kazunori Kobayashi, Tokyo (JP); Shoichiro Saito, Tokyo (JP); Hiroaki Ito, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 297 days.

(21) Appl. No.: 17/603,263

(22) PCT Filed: Apr. 3, 2020

(86) PCT No.: PCT/JP2020/015261
§ 371 (c)(1),
(2) Date: Oct. 12, 2021

(87) PCT Pub. No.: WO2020/213427
PCT Pub. Date: Oct. 22, 2020

(65) Prior Publication Data
US 2022/0199083 A1 Jun. 23, 2022

(30) Foreign Application Priority Data
Apr. 17, 2019 (JP) .................................. 2019-078762

(51) Int. Cl.
*G10L 15/00* (2013.01)
*G10L 15/04* (2013.01)
(Continued)

(52) U.S. Cl.
CPC .............. *G10L 15/22* (2013.01); *G10L 15/05* (2013.01); *G10L 25/87* (2013.01); *G10L 2015/223* (2013.01)

(58) Field of Classification Search
CPC ......... G10L 15/22; G10L 15/05; G10L 25/87; G10L 15/00; G10L 15/08; G10L 15/222;
(Continued)

(56) References Cited

U.S. PATENT DOCUMENTS 10,186,254 B2 * 1/2019 Williams ................ G10L 15/04
2016/0351196 A1 * 12/2016 Fanty .................... G10L 15/183
(Continued)

FOREIGN PATENT DOCUMENTS

CN 106970908 A * 7/2017 ......... G06F 17/2785

OTHER PUBLICATIONS

Nishimura et al. "Recent Advances and Possibilities of Innovation in Speech Interface Technology", information processing, Information Processing Society of Japan, Nov. 2010, vol. 51, No. 11, p. 1434 to 1439, with English translation generated by computer.

*Primary Examiner* — Michael Ortiz-Sanchez

(57) ABSTRACT

A command analysis device capable of shortening the time until a command is executed is provided. The command analysis device includes a speech recognition unit that performs, every time when a predetermined unit of a speech signal is input, speech recognition on the speech signal and acquires a partial speech recognition result which is an intermediate result, and a command analysis unit that verifies an intermediate result in light of a predetermined intermediate result recognition rule, and outputs an analysis result during the input of the speech signal when a command execution target and a command execution content are successfully analyzed are provided.

3 Claims, 8 Drawing Sheets

(51) Int. Cl.
   *G10L 15/05*   (2013.01)
   *G10L 15/22*   (2006.01)
   *G10L 25/87*   (2013.01)
(58) Field of Classification Search
   CPC ... G10L 2015/223; G06F 3/167; G06F 40/279
   See application file for complete search history.

(56) References Cited

U.S. PATENT DOCUMENTS

2017/0069308 A1* 3/2017 Aleksic ................ G06F 40/279
2017/0221486 A1* 8/2017 Kurata .................... G10L 13/00
2018/0330723 A1* 11/2018 Acero ..................... G10L 25/78
2020/0365146 A1* 11/2020 Adiba ..................... G10L 25/78

* cited by examiner

COMMAND ANALYSIS DEVICE, COMMAND ANALYSIS METHOD, AND PROGRAM

CROSS-REFERENCE TO RELATED APPLICATIONS

This application is a U.S. 371 Application of International Patent Application No. PCT/JP2020/015261, filed on 3 Apr. 2020, which application claims priority to and the benefit of JP Application No. 2019-078762, filed on 17 Apr. 2019, the disclosures of which are hereby incorporated herein by reference in their entireties.

TECHNICAL FIELD

The present invention relates to a command analysis device, a command analysis method, and a program for analyzing what kind of command is issued from a speech recognition result.

BACKGROUND ART

In a system that uses speech recognition to operate an automobile infotainment system as described in Non Patent Literature 1, the system analyzes a character string as a speech recognition result to determine what kind of command has been issued. This system can determine a fixed sentence command and analyze a command using different wordings. The commands are analyzed according to a rule prepared in advance. An example of such a rule includes that a command including a combination of "air conditioner", "temperature", and "raise" is determined to be a command for raising the temperature of an air conditioner. FIG. 1 illustrates an example of a configuration of a command analysis device according to a related art. As illustrated in the figure, the command analysis device 9 according to a related art includes a recognition rule storage unit 90*a*, a speech recognition unit 91, and a command analysis unit 92. FIG. 2 illustrates an example of operations performed by the command analysis device according to a related art. The speech recognition unit 91 acquires a speech signal, performs speech recognition, and obtains a recognition result (S91). The command analysis unit 92 analyzes a command from the recognition result based on a recognition rule stored in the recognition rule storage unit 90*a*, and outputs the analysis result (S92).

CITATION LIST

Non Patent Literature

Non Patent Literature 1: Masafumi Nishimura, Gakuto Kurata, "Recent Advances and Possibilities of Innovation in Speech Interface Technology", information processing, Information Processing Society of Japan, November 2010, vol. 51, No. 11, p. 1434 to 1439

SUMMARY OF THE INVENTION

Technical Problem

The command analysis according to the related art is implemented after the speech recognition result has been confirmed, meaning that there might be a time lag between the time when the command is actually executed and the time when the command has been issued.

In view of the above, an object of the present invention is to provide a command analysis device that can shorten the time to execute a command.

Means for Solving the Problem

The command analysis device according to the present invention includes a speech recognition unit and a command analysis unit.

Every time a predetermined unit of a speech signal is input, the speech recognition unit performs speech recognition on the speech signal, and acquires a partial speech recognition result (hereinafter, referred to as an "intermediate result"). The command analysis unit verifies the intermediate result in light of a predetermined intermediate result recognition rule, and outputs an analysis result during the input of the speech signal, when a command execution target and a command execution content are successfully analyzed.

Effects of the Invention

With the command analysis device according to the present invention, the time to execute a command can be shortened.

DESCRIPTION OF EMBODIMENTS

Hereinafter, embodiments of the present invention will be described in detail. Components having the same function are denoted by the same reference signs, and redundant description thereof will be omitted.

First Embodiment

A description will be given below on a spoken word input to the command analysis device according to a first embodiment, a recognition result thereof (intermediate result, final result), and a result of analysis on a command, with reference to FIG. 3.

The command analysis device according to the first embodiment receives a speech signal as an input, acquires a speech recognition result from the speech signal, and analyzes the command based on a rule set in advance. In the present embodiment, two rules for command analysis are prepared in advance. One is a final result recognition rule, and the other one is an intermediate result recognition rule.

The intermediate result recognition rule is utilized for command analysis providing a partial speech recognition result (hereinafter referred to as an "intermediate result"), and the final result recognition rule is utilized only for a speech recognition result (hereinafter referred to as a "final result") including the end of a sentence.

The intermediate result recognition rule is a rule that can analyze (identify) a command even at a point when a speech signal has not reached the end of a sentence (the end of a sentence has not been input), that is, even while the speech recognition is still in progress. The final result recognition rule is a rule that cannot analyze (identify) the command while the speech recognition is still in progress.

Figure 1:
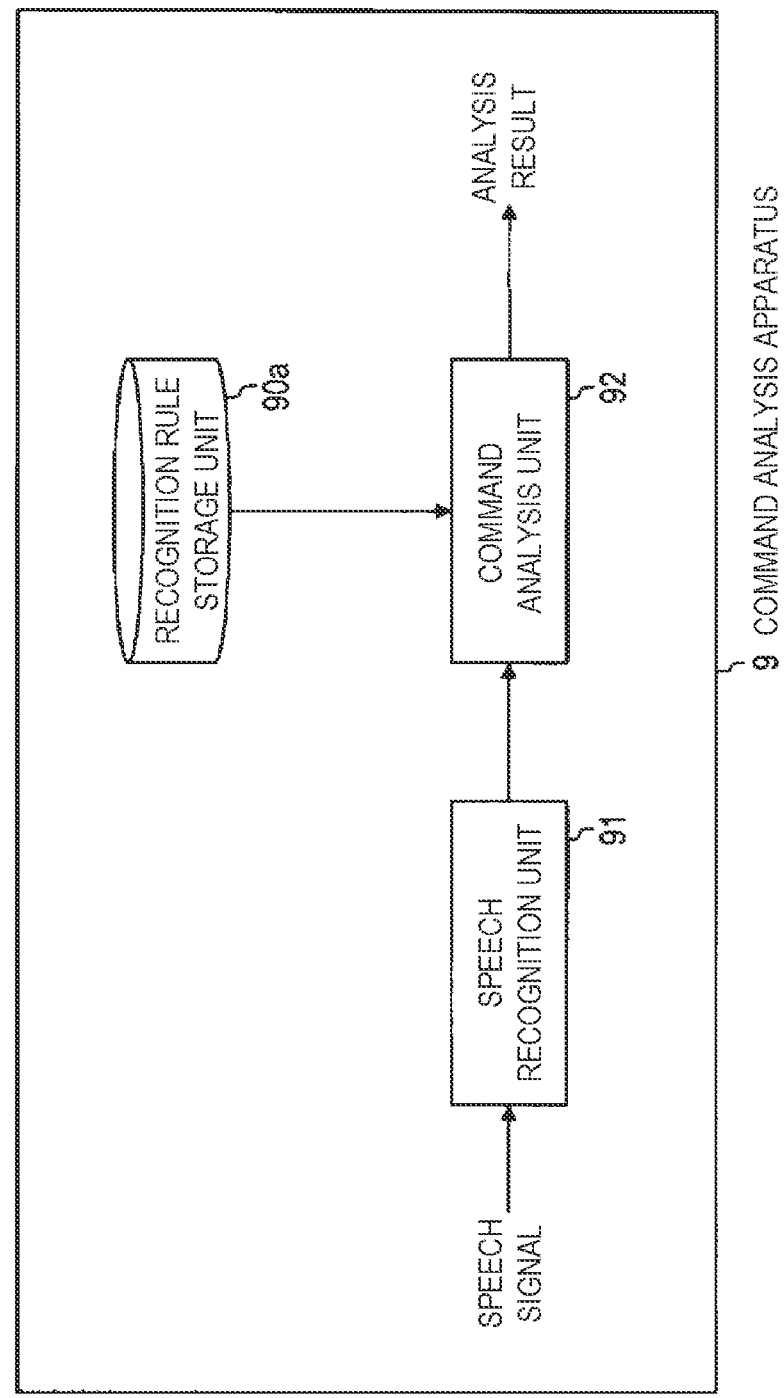
FIG. 1 is a block diagram illustrating an example of a configuration of a command analysis device according to a related art.
Figure 2:
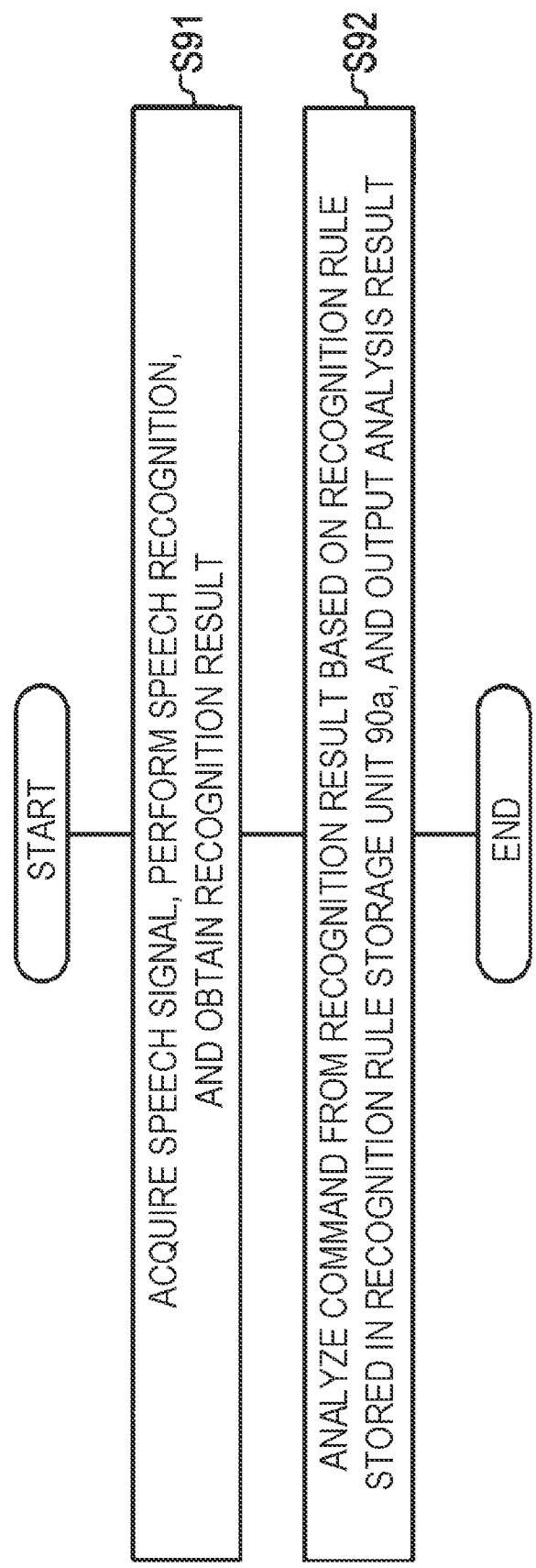
FIG. 2 is a flowchart illustrating an example of operations performed by the command analysis device according to a related art.
Figure 3:
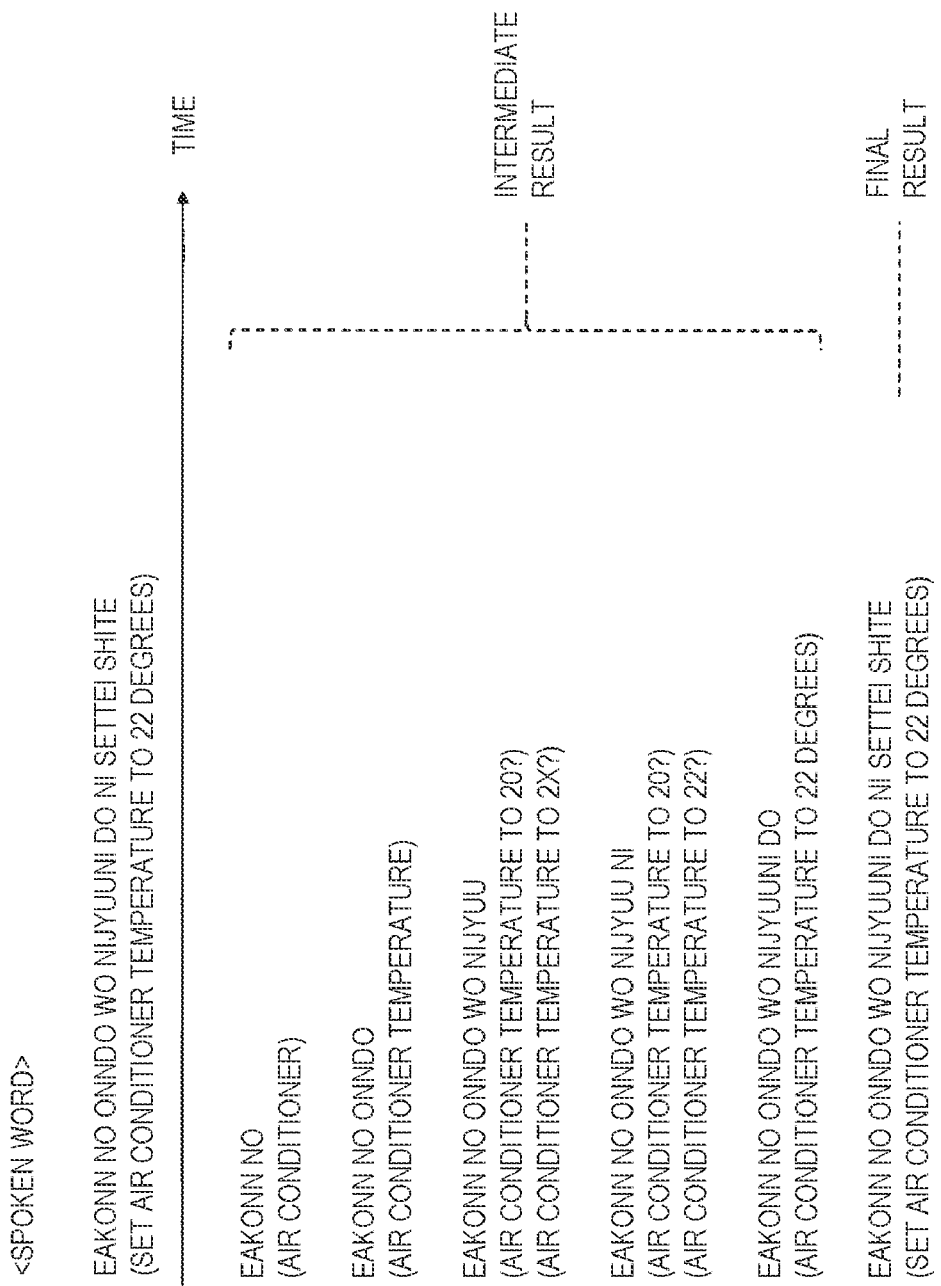
FIG. 3 is a diagram illustrating a first example of a spoken word input to a command analysis device according to a first embodiment.

As exemplified in FIG. 3, if the spoken word is "set an air conditioner temperature to 22 degrees", at a point where "eakonn no onndo wo nijyuu (an air conditioner temperature to twenty)" has been uttered, there are two possible sentences: "set an air conditioner temperature to twenty"; and "set an air conditioner temperature to twenty or higher". In addition, at a point where "eakonn no onndo wo nijyuu ni (an air conditioner temperature to twenty . . . )" has been uttered, there are two possible sentences including: "set an air conditioner temperature to twenty"; and "set an air conditioner temperature to twenty two".

On the other hand, at a point where "eakonn no onndo wo nijyuuni do (an air conditioner temperature to twenty two degrees)" has been uttered, the sentence can be confirmed to be "set an air conditioner temperature to 22 degrees". Thus, the intermediate result recognition rule can be a rule including "air conditioner" as the command execution target, and "temperature" and "X degrees" (where X is any number within a settable range of the temperature of the air conditioner) as the command execution content.

An example of the spoken word for the air conditioner, other than the one described above, includes "raise the temperature of the air conditioner by three degrees". For such a spoken word, a rule limiting X to be within a settable range (18 to 30 for example) of the air conditioner temperature is preferably set to prevent erroneous command analysis.

Figure 4:
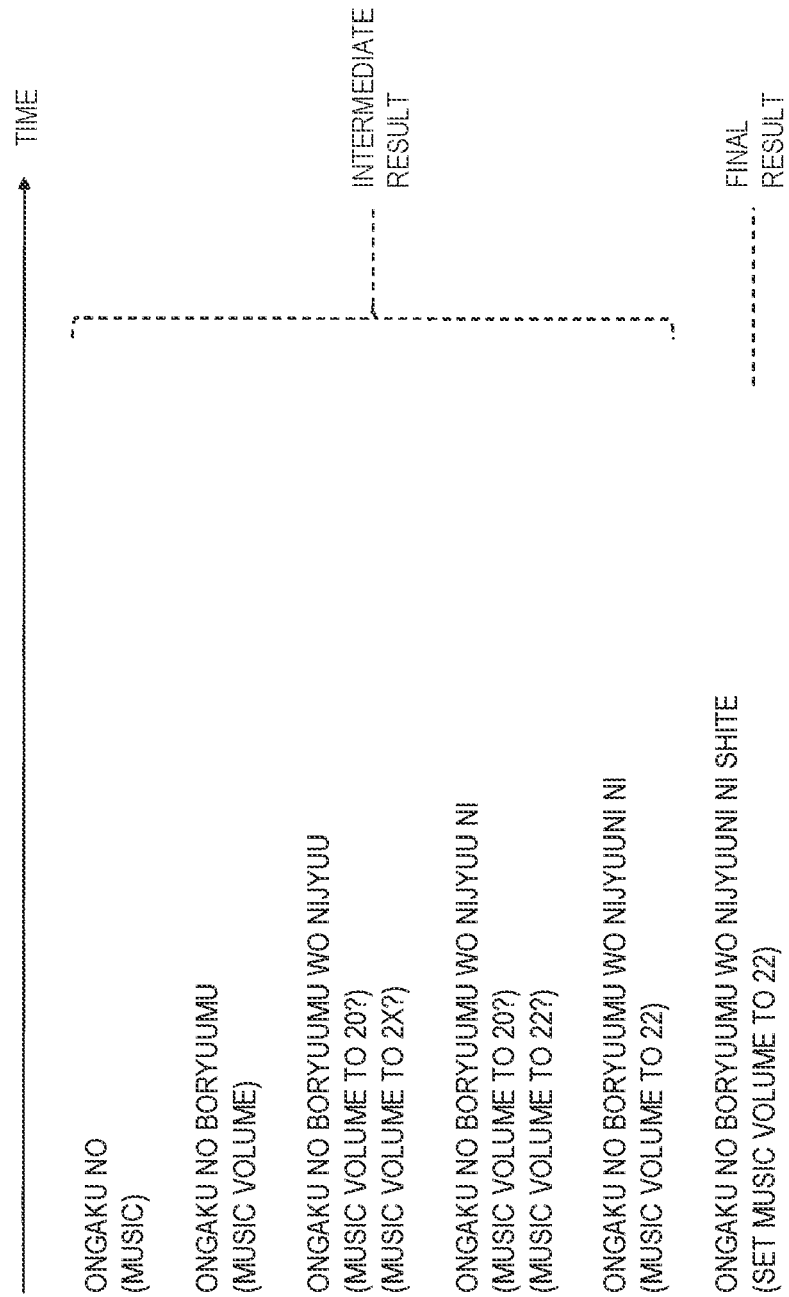
FIG. 4 is a diagram illustrating a second example of a spoken word input to a command analysis device according to the first embodiment.

On the other hand, regarding the spoken word illustrated in FIG. 4, "set a music volume to 22" when a rule is that "music" (hardware playing a song at the point where the word "music" has been uttered) as the command execution target, "volume" and "#" (where "#" indicates a number within a settable range of the volume) as the command execution content are included, there is a possibility that an erroneous command analysis that "set a music volume to 20" is performed at the point when "ongaku no boryuumu wo nijyuu (a music volume to twenty . . . )" has been uttered.

In view of this, "music", "volume", and "to #" are included the intermediate result recognition rule, or are included in the final result rule.

Note that, in the above-described example, an example in which a parameter ("#") is included in the command execution content has been described, but other examples are also possible. For example, if a speech signal is "open the window", the command execution target is "window" and the command execution content is "open", and thus the parameter "#" is not included.

Figure 5:
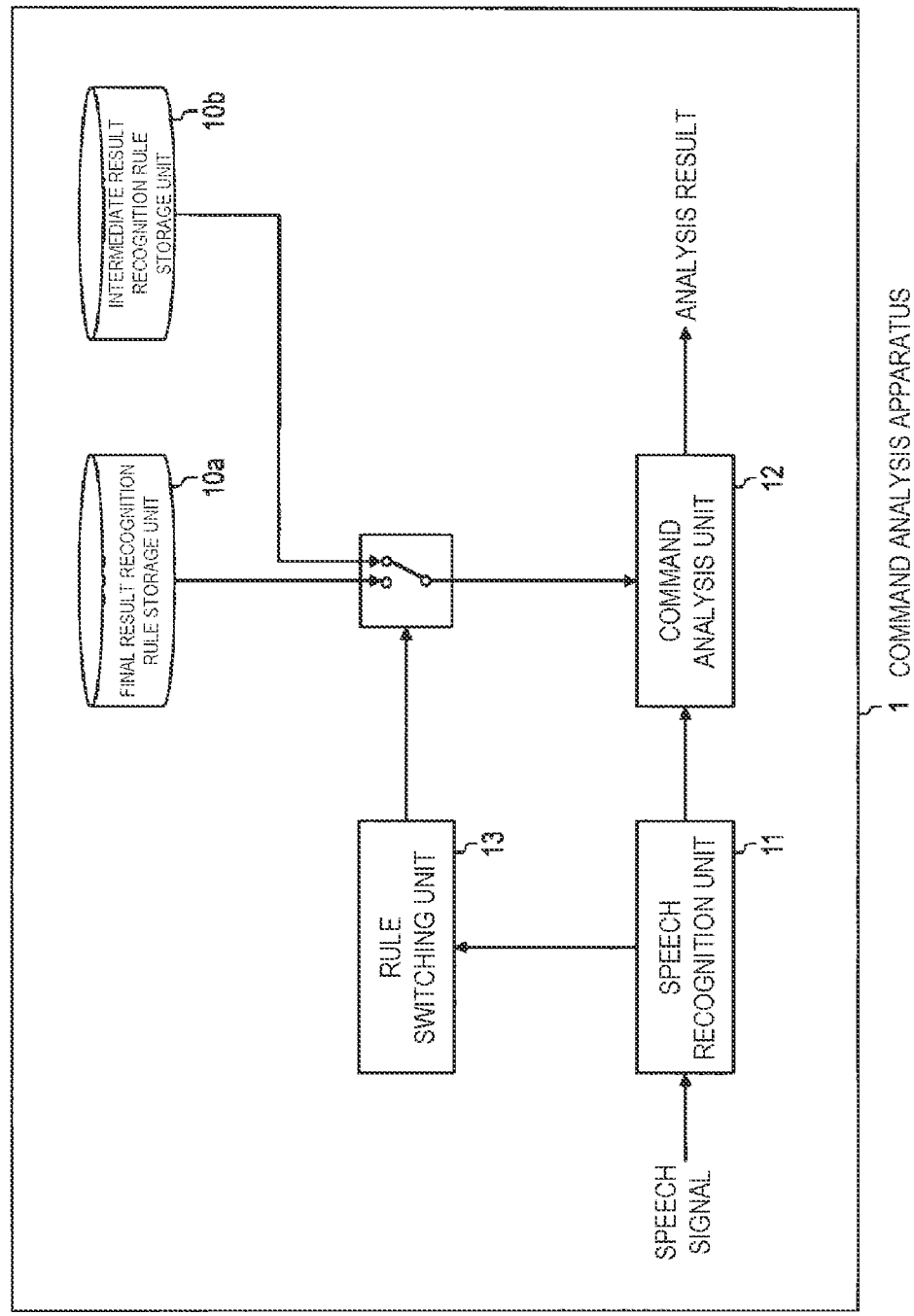
FIG. 5 is a block diagram illustrating a configuration of the command analysis device according to the first embodiment.

A configuration of the command analysis device according to the first embodiment will be described below with reference to FIG. 5. As illustrated in the drawing, the command analysis device 1 according to the present embodiment includes a final result recognition rule storage unit 10a, an intermediate result recognition rule storage unit 10b, a speech recognition unit 11, a command analysis unit 12, and a rule switching unit 13.

Figure 6:
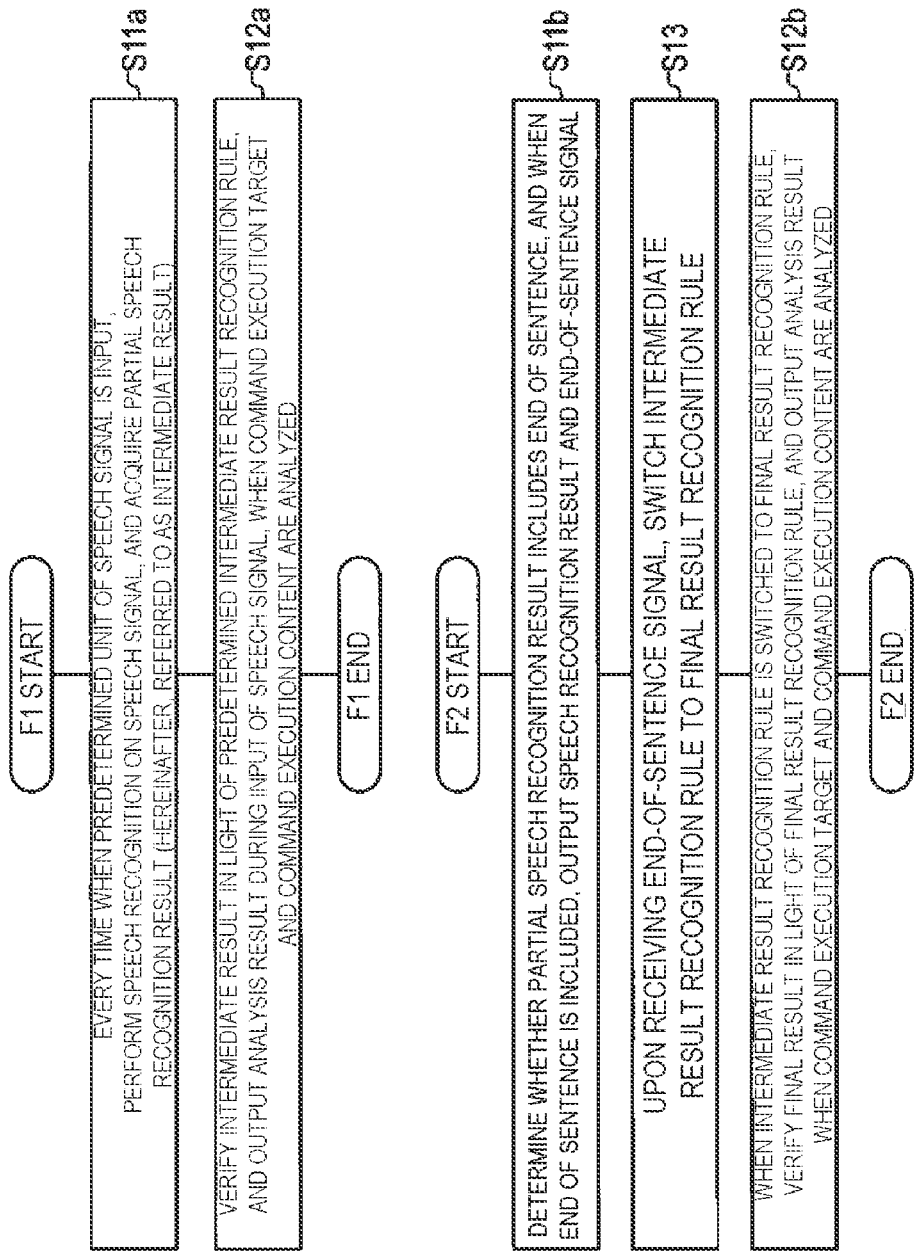
FIG. 6 is a flowchart illustrating operations performed by the command analysis device according to the first embodiment.

Operations performed by the command analysis device 1 according to the present embodiment will be described with reference to FIG. 6. As illustrated in a flowchart F1, every time when a predetermined unit of a speech signal is input, the speech recognition unit 11 performs speech recognition on the speech signal, and acquires a partial speech recognition result (hereinafter, referred to as an intermediate result) (S11a). The command analysis unit 12 verifies the intermediate result in light of a predetermined intermediate result recognition rule stored in the intermediate result recognition rule storage unit 10b, and outputs an analysis result during the input of the speech signal, when a command execution target and a command execution content are successfully analyzed (S12a).

Note that the speech recognition unit 11 determines whether the partial speech recognition result include the end of a sentence, and when the end of a sentence is included (F2 start), the speech recognition unit 11 outputs a speech recognition result (hereinafter, referred to as a "final result") to the command analysis unit 12, and outputs an end-of-sentence signal to the rule switching unit 13 (S11b). Upon receiving the end-of-sentence signal, the rule switching unit 13 switches the intermediate result recognition rule to the final result recognition rule stored in advance in the final result recognition rule storage unit 10a (S13). When the intermediate result recognition rule is switched to the final result recognition rule, the command analysis unit 12 verifies the final result in light of the final result recognition rule, and outputs the analysis result when the command execution target and the command execution content is successfully analyzed (S12b).

The command analysis device 1 according to the present embodiment performs the command analysis by verifying the partial speech recognition result in light of the intermediate result recognition rule. Thus, the analysis result can be output during the input of the speech signal, whereby the time until the command execution can be shortened.

Second Embodiment

In a second embodiment, three rules for command analysis are prepared in advance. The three rules are the final result recognition rule, the intermediate result recognition rule, and a second intermediate result recognition rule. The final result recognition rule and the intermediate result recognition rule are the same as those in the first embodiment. The second intermediate result recognition rule is a rule activated when a silence interval is detected or when a speech recognition result is not acquired for a predetermined period of time.

Figure 7:
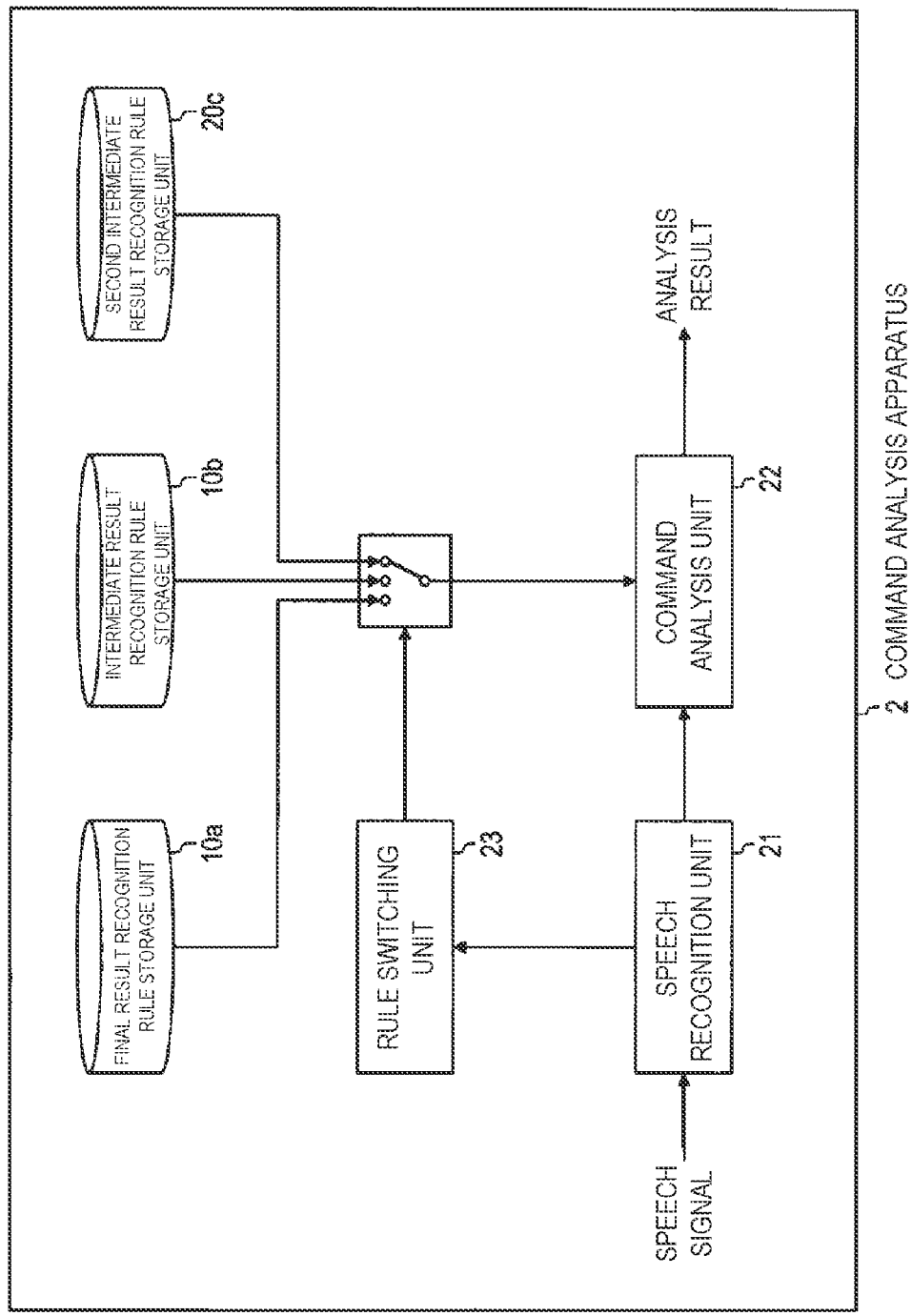
FIG. 7 is a block diagram illustrating a configuration of a command analysis device according to a second embodiment.

A configuration of the command analysis device according to the second embodiment will be described below with reference to FIG. 7. As illustrated in the drawing, a command analysis device 2 according to the present embodiment includes the final result recognition rule storage unit 10a, the intermediate result recognition rule storage unit 10b, a second intermediate result recognition rule storage unit 20c, a speech recognition unit 21, a command analysis unit 22, and a rule switching unit 23. The final result recognition rule storage unit 10a and the intermediate result recognition rule storage unit 10b are the same as those in the first embodiment.

Figure 8:
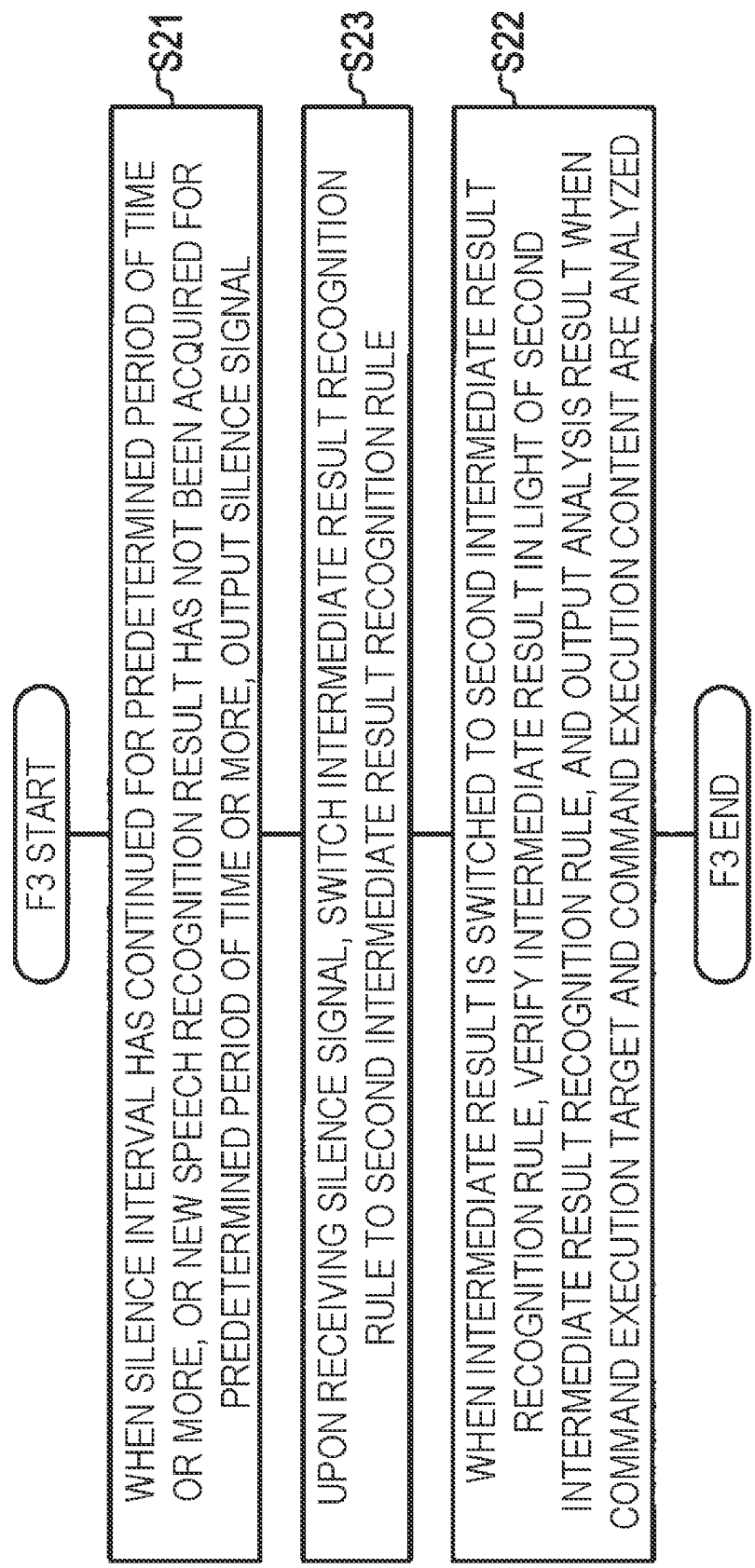
FIG. 8 is a flowchart illustrating operations performed by the command analysis device according to the second embodiment.

Operations performed by the command analysis device 2 according to the present embodiment will be described with reference to FIG. 8. As illustrated in a flowchart F3, when a partial speech recognition result does not include the end of a sentence, the speech recognition unit 21 determines whether a silence interval has continued for a predetermined period of time or more, or whether the speech recognition result has not been newly acquired for a predetermined period of time or more. When the result indicates that the silence interval has continued for a predetermined period of time or more or that the speech recognition result has not been newly acquired for a predetermined period of time or more, the speech recognition unit 21 outputs a silence signal (S21). For example, the speech recognition unit 21 may count the time during which the silence interval continues, and output the silence signal when the time exceeds a threshold (for example one to three seconds) set in advance. Similarly, the speech recognition unit 21 may count the time during which no speech recognition result is acquired, and output the silence signal when the time exceeds a threshold (for example one to three seconds) set in advance.

When a person speaks a command sentence, a pause time during which no word is uttered should not be so long. Thus, a command may be confirmable in response to a pause of a predetermined period of time.

For example, in a case of a sentence, "music volume to 20", in the present embodiment, by taking advantage of the fact that no long pause should follow the utterance of a number, "music", "volume", and "#" may be set to the second intermediate result recognition rule, so that the command may be confirmed at an earlier stage than in the method according to the first embodiment.

Upon receiving the silence signal, the rule switching unit 23 switches the intermediate result recognition rule to the second intermediate result recognition rule stored in advance in the second intermediate result recognition rule storage unit 20c (S23). When the intermediate result recognition rule is switched to the second intermediate result recognition rule, the command analysis unit 22 verifies the intermediate result in light of the second intermediate result recognition rule, and outputs the analysis result when the command execution target and the command execution content are successfully analyzed (S22).

Note that the speech recognition unit 21 performs steps S11a and S11b described above, the command analysis unit 22 performs steps S12a and S12b, and the rule switching unit 23 performs step S13 described above as appropriate, and the operations (flowcharts F1 and F2) as in the first embodiment are performed as appropriate.

In addition to the effects of the first embodiment, the command analysis device 2 according the present embodiment performs the command analysis by verifying the partial speech recognition result in light of the second intermediate result recognition rule, even when the speech signal is interrupted at a point other than the end of a sentence, and thus can shorten the time until the command is executed.

With the command analysis devices 1 and 2 according to the first and the second embodiments, the command is analyzed by determining whether a condition is satisfied on a word-to-word or frame-to-frame basis, whereby the command can be analyzed and output without performing parsing on a sentence-to-sentence basis.

Supplements

The device according to the present invention includes, for example, as single hardware entities, an input unit to which a keyboard or the like can be connected, an output unit to which a liquid crystal display or the like can be connected, a communication unit to which a communication device (for example, a communication cable) capable of communication with the outside of the hardware entity can be connected, a Central Processing Unit (CPU, which may include a cache memory, a register, and the like), a RAM or a ROM that is a memory, an external storage device that is a hard disk, and a bus connected for data exchange with the input unit, the output unit, the communication unit, the CPU, the RAM, the ROM, and the external storage devices. Further, a device (drive) capable of reading and writing from and to a recording medium such as a CD-ROM may be provided in the hardware entity as necessary. An example of a physical entity including such hardware resources is a general-purpose computer.

A program necessary to implement the above-described functions, data necessary for processing of this program, and the like are stored in the external storage device of the hardware entity (the present disclosure is not limited to the external storage device; for example, the program may be read out and stored in a ROM that is a dedicated storage device). Further, for example, data obtained by the processing of the program is appropriately stored in a RAM, the external storage device, or the like.

In the hardware entity, each program and data necessary for the processing of each program stored in the external storage device (or a ROM, for example) are read into a memory as necessary and appropriately interpreted, executed, or processed by a CPU. As a result, the CPU implements a predetermined function (each of components represented by xxx unit, xxx means, or the like).

The present invention is not limited to the above-described embodiment, and appropriate changes can be made without departing from the spirit of the present disclosure. Further, the processing described in the embodiments are not only executed in time series in the described order, but also may be executed in parallel or individually according to a processing capability of a device that executes the processing or as necessary.

As described above, when a processing function in the hardware entity (the device of the present invention) described in the embodiment is implemented by a computer, processing content of a function that the hardware entity should have is described by a program. By executing this program using the computer, the processing function in the hardware entity is implemented on the computer.

The program in which the processing details are described can be recorded on a computer-readable recording medium. The computer-readable recording medium can be any type of medium such as a magnetic recording device, an optical disc, a magneto-optical recording medium, or a semiconductor memory. Specifically, for example, a hard disk device, a flexible disk, a magnetic tape, or the like can be used as a magnetic recording device, a Digital Versatile Disc (DVD), a DVD-Random Access Memory (RAM), a Compact Disc Read Only Memory (CD-ROM), CD-R (Recordable)/RW (ReWritable), or the like can be used as an optical disc, a Magneto-Optical disc (MO) or the like can be used as a magneto-optical recording medium, and an Electronically Erasable and Programmable-Read Only Memory (EEP-ROM) or the like can be used as a semiconductor memory.

The program is distributed, for example, by selling, giving, or lending a portable recording medium such as a DVD or a CD-ROM with the program recorded on it. Further, the program may be stored in a storage device of a server computer and transmitted from the server computer to another computer via a network, so that the program is distributed.

For example, a computer executing the program first temporarily stores the program recorded on the portable recording medium or the program transmitted from the server computer in the own storage device. When the computer executes the processing, the computer reads the program stored in the recording medium of the computer and executes a process according to the read program. As another execution form of the program, the computer may directly read the program from the portable recording medium and execute processing in accordance with the program. Further, each time the program is transmitted from the server computer to the computer, the computer executes processing in order in accordance with the received program. In another configuration, the processing may be executed through a so-called application service provider (ASP) service in which functions of the processing are implemented just by issuing an instruction to execute the program and obtaining results without transmission of the program from the server computer to the computer. The program in this form is assumed to include a program which is information provided for processing of a computer and is equivalent to a program (data or the like that has characteristics regulating processing of the computer rather than a direct instruction for a computer).

Further, although the hardware entity is configured by a predetermined program being executed on the computer in the present embodiment, at least a part of the processing content of the hardware entity may be implemented in hardware.

The invention claimed is:

1. A command analysis device, comprising circuitry configured to:
    retrieve a final result recognition rule from a final result recognition rule storage device, a first intermediate result recognition rule from a first intermediate result recognition rule storage device, and a second intermediate result recognition result from the second intermediate recognition result storage device, wherein the first intermediate result recognition rule, the second intermediate result recognition rule, and the final result recognition rule are predetermined and are mutually distinct;
    perform, every time when a predetermined unit of a speech signal is input, speech recognition on the speech signal and acquire a partial speech recognition result, which is a first intermediate result, wherein the perform operation further configured to:
        determine whether the partial speech recognition result includes an end of a sentence, and output the speech recognition result, which is a final result, and an end-of-sentence signal when the end of a sentence is included;
        determine, when the partial speech recognition result does not include the end of a sentence, whether a silence interval has continued for a predetermined period of time or more, or whether a new instance of the speech recognition result has not been acquired for a predetermined period of time or more, and output a silence signal when the silence interval has continued for the predetermined period of time or more or when a new instance of the speech recognition result has not been acquired for a predetermined period of time or more,
    switch the first intermediate result recognition rule to the second intermediate result recognition rule upon receiving the silence signal, wherein the second intermediate result recognition rule allows commands to be analyzed even when the speech signal is interrupted at a point other than the end of a sentence, and
    switch the first intermediate result recognition rule to the final result recognition rule, upon receiving the end-of-sentence signal, the final result recognition rule does not identify the command while the speech recognition is in progress;
    verify the first intermediate result using the first intermediate result recognition rule to parse a command in the speech signal according to the speech recognition, wherein the first intermediate result recognition rule includes recognizing the command before the speech signal reaches an end of a sentence, wherein the verify operation is further configured to:
        verify the intermediate result in light of the second intermediate result recognition rule when the intermediate result recognition rule is switched to the second intermediate result recognition rule, and
        verify the final result in light of the final result recognition rule when the intermediate result recognition rule is switched to the final result recognition rule; and
    output an analysis result during the input of the speech signal when a command execution target and a command execution content are successfully analyzed, wherein the analysis result indicates a type of the command conveyed by the speech signal.

2. A command analysis method performed by a command analysis device, the command analysis method comprising:
    retrieving a final result recognition rule from a final result recognition rule storage, a first intermediate result recognition rule from a first intermediate result recognition rule storage, and a second intermediate result recognition result from the second intermediate recognition result storage, wherein the first intermediate result recognition rule, the second intermediate result recognition rule, and the final result recognition rule are predetermined and are mutually distinct;
    performing, every time when a predetermined unit of a speech signal is input, speech recognition on the speech signal and acquiring a partial speech recognition result which is a first intermediate result, wherein the performing further comprises:
        determining whether the partial speech recognition result includes an end of a sentence, and outputting the speech recognition result, which is a final result, and an end-of-sentence signal when the end of a sentence is included;
        determining, when the partial speech recognition result does not include the end of a sentence, whether a silence interval has continued for a predetermined period of time or more, or whether a new instance of the speech recognition result has not been acquired for a predetermined period of time or more, and output a silence signal when the silence interval has continued for the predetermined period of time or more or when a new instance of the speech recognition result has not been acquired for a predetermined period of time or more, switching the first intermediate result recognition rule to the second intermediate result recognition rule upon receiving the silence signal, wherein the second intermediate result recognition rule allows commands to be analyzed even when the speech signal is interrupted at a point other than the end of a sentence, and switching the first intermediate result recognition rule to the final result recognition rule, upon receiving the end-of-sentence signal, the final result recognition rule does not identify the command while the speech recognition is in progress;

verifying the first intermediate result using the first intermediate result recognition rule to parse a command in the speech signal according to the speech recognition, wherein the first intermediate result recognition rule includes recognizing the command before the speech signal reaches an end of a sentence, wherein the verifying further comprises:

verifying the intermediate result in light of the second intermediate result recognition rule when the intermediate result recognition rule is switched to the second intermediate result recognition rule, and verifying the final result in light of the final result recognition rule when the intermediate result recognition rule is switched to the final result recognition rule; and when a command execution target and a command execution content are successfully analyzed, outputting an analysis result during the input of the speech signal, wherein the analysis result indicates a type of the command conveyed by the speech signal.

3. A computer-readable non-transitory recording medium storing a computer-executable program instructions that when executed by a processor cause a computer to operate as the command analysis device according to claim 1.

* * * * *